Figure 1:
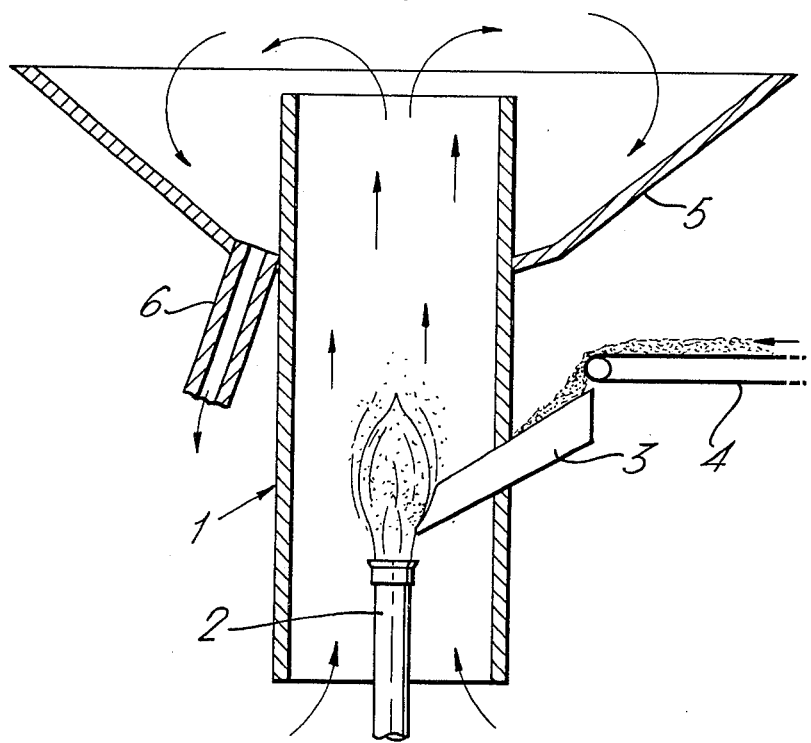

United States Patent [19]
Knoss

[11] 3,877,960
[45] Apr. 15, 1975

[54] METHOD OF METAL COATING PARTICLES

[75] Inventor: Walter Knoss, Kirchheimbolanden, Germany

[73] Assignee: Ballotini Europe Deutschland GmbH, Kirchheimbolanden, Germany

[22] Filed: Sept. 15, 1972

[21] Appl. No.: 289,617

[30] Foreign Application Priority Data
Mar. 13, 1969 United Kingdom............... 13345/69
Jan. 1, 1970 United Kingdom..................... 40/70
Jan. 1, 1970 United Kingdom..................... 41/70
Jan. 1, 1970 United Kingdom..................... 42/72

[52] U.S. Cl. .................. 264/15; 427/185; 427/213; 427/217
[51] Int. Cl. ........................................... B44d 1/02
[58] Field of Search ........ 117/100 M, 100 S, 100 B, 117/105.2, 126 GM, 130 R, 131, 37 R, 46 FS, 26, 100 C, 22, 25

[56] References Cited
UNITED STATES PATENTS

| | | | |
|---|---|---|---|
| 933,324 | 9/1909 | Mowry | 117/109 |
| 2,286,237 | 6/1942 | Shaw et al. | 117/100 |
| 2,788,297 | 4/1957 | Louis | 117/100 C |
| 2,990,807 | 7/1961 | Gerow | 118/48 |
| 3,019,485 | 2/1962 | Diamond | 264/15 |
| 3,019,515 | 2/1962 | Whitehurst et al. | 29/195 |
| 3,192,064 | 6/1965 | Cerych et al. | 117/100 |
| 3,196,032 | 7/1965 | Seymour | 117/100 C |
| 3,447,950 | 6/1969 | Evans et al. | 117/100 |

*Primary Examiner*—William D. Martin
*Assistant Examiner*—Dennis C. Konopack
*Attorney, Agent, or Firm*—Cushman, Darby & Cushman

[57] ABSTRACT

The new method starts with the coating metal in particle form, mixed with the particles to be coated. The mixture is heated, e.g., in a gas-fired furnace tube or by means of a plasma torch to a temperature sufficient to bring at least some of the metal to a molten and/or vapour state. The fluid metal is thus formed within the total particle mixture and transfers or condenses onto the particles to be coated. Depending on the proportion of metal in the starting mixture and the temperature to which the mixture is heated, the substrate particles become all-over coated or spotcoated with metal. The method can be performed continuously by continuously feeding the particles through a heating zone, and a high rate of processing is possible in apparatus of small size. The principal substrate particles in view are particles of glass, vitrocrystalline material, ceramics or plastics.

4 Claims, 2 Drawing Figures

METHOD OF METAL COATING PARTICLES

This is a continuation, of application Ser. No. 17,633, filed Mar. 9, 1970, now abandoned.

This invention relates to methods of forming metal coatings on particles of other materials.

The term "particle" includes both unshaped and shaped pieces of material.

Conventional methods of depositing thin metallic films on substrates involve the use of a high vacuum or involve exposure of the substrate to a metal compound and reduction of this compound in situ. The high vacuum method is rather expensive and is not well suited for coating particles in a continuous as distinct from a batch method and the chemical method necessarily involves the formation of residual reaction products which have to be removed and either wasted or converted.

The present invention provides a method in which the metal of which the coating is to be formed is used as such as starting material so that there are no residual or waste products, but in which high vacuum conditions are not required. Indeed the method can be performed at atmospheric pressure.

It has been found that satisfactory solid metal coatings can be formed on substrate particles under normal atmospheric pressure conditions by condensation of metal from the vapour phase and/or by solidification of molten metal in situ if the metal is heated in the form of particles mixed with the particles to be coated. The vapour or liquid metal is as it were formed within the mass of particles to be metallised.

The present invention, as broadly defined, accordingly resides in a method of forming metal coatings on solid particles or other material characterised in that a mixture of particles of the coating metal with the particles to be coated is heated to cuase at least some of such metal to become fluid and at least some of the metal thus brought to a fluid state deposits and solidifies on said particles to be coated.

In any given embodiment of the invention, the heating may cause melting or melting and vapourisation of some of the metal composing the metal particles, and the metal coatings on the other particles may form by transfer of molten metal onto or condensation of metal vapour on such particles, or by a combination of such phenomena, followed by solidification of the metal in situ.

The coating metal may comprise a single metal element or it may comprise an alloy the composition of which may be selected so that the melting point of the alloy is appropriate for the temperature conditions obtaining in the coating operation.

It is within the scope of the invention of form composite metal coatings composed of a mixture of different metals by using the different metals mixed together in powder form as the starting material which is mixed with the particles to be coated.

Preferably the mixed particles are kept mainly in separated or at least in a very loose condition by passage of a gas through the mixture of particles during the heating thereof.

For achieving the best results it is important for the particles of coating metal to be thoroughly mixed with the particles to be coated so as to be substantially uniformly distributed throughout the total particle mixture and to remain so distributed during the heating of the mixture. The relative sizes and specific gravities of the substrate particles on the one hand and the coating metal particles on the other hand are self evidently important for this result. The permissible size disparity if uniform treatment of the mass of substrate particles is to be realised depends in part on the physical form of the particles. As a general guide, when the particles of coating metal are of granular form these particles should preferably not be less than one tenth of the size of the particles to be coated whereas if the particles of coating metal are in the form of flakes, a larger size disparity can often be tolerated. When using metal flakes a tendency has been observed for the flakes to adhere to the particles to be coated and the metallising of these latter particles then occurs at least in part by melting of metal of the flakes and solidification of such metal in situ, on the particles to be coated.

The invention can be performed by heating a mixture of metal powder and particles of the material to be coated, e.g., in a flame or in a hot gas stream. Thus the particle mixture can be fed to a flame spraying gun. A suitable type of gun is that manufactured by Metco Incorporated of Westbury, L.I., N.Y., United States of Americal and known as the "Metco" (Trade Mark) "Thermospray" 2 P with vibratory feeder. The gun may be fired with hydrogen and oxygen or actylene and oxygen. As an alternative, the particle mixture may be fed into a furnace tube within which the particles move in a current of hot gas maintained at the necessary high temperature, e.g., by gas burners.

Another way of heating the mixture of particles of coating metal and the particles to be coated is to use a plasma torch.

The coating method according to the invention is preferably performed continuously by continuously feeding a mixture of particles of coating metal and particles to be coated through a heating zone in which the deposition of metal on the particles to be coated takes place.

The coating method according to the invention enables the substrated particles to be coated very rapidly and apparatus for performing the method continuously can have a very high throughout capacity in relation to its size. Preferably the heating of the particles of coating metal and the transfer or condensation of metal on the particles to be coated are accomplished in less than ten seconds. Such a rapid processing, even processing in less than 5 seconds, is possible by the coating methods hereinbefore referred to. When using a flame spraying gun the duration of the particle mixture in the heating and coating zone may be less than 1 second, e.g., between 0.1 and 0.5 second, while when using a plasma torch the heating and coating can occur virtually instantaneously.

The coating method is preferably performed at atmospheric pressure or at a pressure only slightly less than atmospheric such as, e.g., will prevail in a furnace tube due to natural draught.

The invention can be performed for metallising particles of a wide range of different materials to produce metallised particles for a wide range of purposes. To mention a few examples of possible uses of metallised particles: they can be used in chemical processes in which the coating metal serves as catalyst and the substrate particles as catalyst carrier; they can be used to form a porous radiant-heat-reflecting packing which can if required be cooled by flowing a coolant through the particle inter-spaces; they can be used as a filler in plastics materials to give a composite product having electrical and antistatic properties determined in part by the metal coatings on the filler particles; they can be used in microwave reflectors to confer thereon an appropriate refractive index having regard to the incident microwaves; they can be used to form sintered products. The intended use of the metallised particles will of course influence the choice of the size, form and composition of the particles and of the coating metal.

As will hereafter be exemplified a method according to the invention can be performed so that the substrate particles become all-over coated with metal or so that each of such particles becomes coated with metal at a multiplicity of places distributed over its entire area. For example, the metal may be deposited at scores or even hundreds of surface spots or zones, which spots or zones may, e.g., be of the order of 2-50 microns in each direction along the coated surface.

The main parameters determining whether or not an all-over coating is obtained are the quantity of vapour available for condensing on the particles (in other words the proportion of metal particles to substrate particles in the starting mixture) and the temperature, although the size of the particles of coating metal also has an influence on the result. Preliminary tests enable suitable operating conditions to be predetermined. Certain specific examples will be given hereinafter.

In the case that shaped particles, e.g., spherical beads, of light-transmitting material, e.g., glass, are discontinuously coated with metal as above indicated, the resulting coated beads have reflex-reflecting properties in respect of incident light which are as good as or even better than those of uncoated beads and are in some cases as good as the reflex-reflecting properties of beads bearing a continuous reflector coating over half of their surfaces. This is of practical importance for simplifying manufacture and because when applying discontinuously coated beads to a base matrix to form a light-reflecting surface, the orientation of the beads is of no consequence.

Discontinuous or spot-coating is sometimes advantageous when forming radiant-heat-reflecting particles or a plastics filler as hereinbefore referred to. For example in the case of a plastics filler comprising metallised glass particles the plastics can be more effectively bonded to the filler particles if there are places where the glass particles are not coated with metal. A very good bond with various plastics materials can be achieved by employing silane coupling compounds.

Yet another example of the usefulness of discontinuously or spot-coated particles is the production of translucent bodies, e.g., lamp shades, by sintering a mass of the discontinuously metallised particles or by soldering such particles together.

The foregiong are only examples of used of spot-coated particles produced according to the invention.

Spot-coated particles as hereinbefore referred to are new products in their own right and the present invention according includes metal coated solid particles characterised in that each of the particles bears a solid coating of metal at a multiplicity of spaced places distributed over the entire surface of the particle.

The individual coated areas of the spot-coated particles may be of substantially equal dimensions in two directions normal to each other along the surface. However, this is not essential; the areas may be elongated.

The size of the coated areas is generally speaking of some importance for the eventual use of the particles. In all cases it is preferable for the surface of each particle to be populated with scores and preferably hundreds of spots of the coating material. For particles less than 5 mm in size, this implies that the coating spots are minute and form a kind of screen dot pattern on the particle. Thus, for the purposes mainly in view, it is in general suitable for the coated areas of particles less than 5 mm in size to be of the order to 2-50 microns in each direction along the coated surface.

The ratio of metallised to non-metallised surface portions is a factor which is self-evidently of importance in the case of beads to be used for reflex-reflection of light rays. The reflex-reflection of light rays from the rear of the bead is not entirely dependent on the presence or reflectorising coating substance; a proportion of the rays penetrating into the bead will in any case be reflected at the interface between the bead and the contacting medium behind the bead. However the purpose of providing the reflectorising coating is to reduce the proportion of penetrating rays which pass through the rear face of the bead, and thus to increase the light return. In the nature of the case however, any increase in the proportion of reflectorised to non-reflectorised surface at the rear of the bead, (which increase, if it were an isolated factor would increase the light return), involves a corresponding increase in the proportion of reflectorised to non-reflectorised surface at the front of the bead and such an increase militates against the end in view because it reduces the proportion of rays incident on the bead which can penetrate into the bead and have the opportunity of being reflex-reflected. There is thus a nice balance to be observed between conflicting factors if optimum results are to be achieved. Experiments indicate that other things being equal, the results improve as the proportion of reflectorised to non-reflectorised surface approaches 1:1.

After spot-coating the particles, the coating material can in certain cases be chemically modified in situ to form a non-metallic coating material. Indeed, certain metal coatings, e.g., aluminium coatings, will be spontaneously modified, as by oxidation in the ambient air. The invention accordingly also includes solid particles each bearing solid non-metallic coating material at a multiplicity of places distributed over the entire surface of the particle, such non-metallic coating material having been formed by chemical modification in situ of metallic coating material previously applied to said particles.

In the production both all-over and spot-coated particles according to the invention, the most important materials for the substrate particles belong to the group: glass, vitrocrystalline material, and ceramics. This group includes many materials which have very high softening or melting temperatures. However the invention is also of importance for coating particles of various plastics materials, e.g., polystyrene, polymethylmethacrylate, nylon, acetal, acrylonitrile butadiene styrene, cellulosic resins, fluoroplastics, polycarbonates, polyethylene, polypropylene, polysulphones, polyphenylene oxide, polyvinylchloride, styrene-acrylonitrile, alkyd and epoxy resins, melamine, phenol-formaldehyde, phenolic and polyester resins, silicones, ureaformaldehyde and urethanes, "Plexiglass" (Trade Mark) and "Macrolon" (Trade Mark).

It is not essential for the substrate particles to be totally resistant to softening or melting at the temperatures reached during the coating operation. If the substrate material softens or melts at such temperatures it is possible to start with unshaped particles of the substrate and to perform the coating method so that these particles soften or melt superficially and assume the form of rounded beads under surface tension effects, and deposit of the metal on the beads occurs in the same process step. This result is possible for example when using glass powder as substrate starting material.

The substrate particles on which the metal is deposited may be of uniform composition throughout their volumes. Such particles can easily be formed, ready for coating. However, particles of non-uniform composition are not excluded. For example, each particle may comprise an outer layer of different composition from the particle core. Such an outer layer may be composed to promote anchorage of the subsequently applied metal and/or (in the case of spot-coated particles) to promote mutual adhesion of the particles, subsequent to the spot coating thereof, to form a porous mass. In the case of spot-coated glass beads for reflex-reflecting purposes the application of a said outer layer may permit the use of glass of lower refractive index than would otherwise be required.

The particles to be spot-coated or all-over coated are preferably shaped particles. The production of shaped particles or beads implies the production of a substantially predictable average surface and that is of considerable importance for many purposes.

For reasons of potential versatility and ease of manufacture the particles to be coated preferably of rounded shape. The expression "rounded particles" denotes beads of spherical, spheroidal or other shape affording a surface which is convexly curved at all places. The said expression thus includes beads having an ellipsoidal form. It is in some cases advantageous for the rounded particles or beads to be of regular shape as this implies the use of a well controlled manufacturing process and the attainment of a predetermined bead shaping. Metallised beads of predetermined uniform shape, when sintered together, form bodies with predetermined porosity and inner surface. However, regularity of shape is not essential.

In certain important embodiments, the coated particles are of spherical or substantially spherical form. That rounded shape can be produced easily and is favourable to automatic handling of the beads in industrial plant.

The substrate particles may be hollow particles, e.g., so-called microballoons of glass or of a resin.

The particles onto which the metal is deposited may be up to 5 mm in size or even larger. However special importance is attached to embodiments of the invention in which the substrate particles are below 1 mm in size. For many purposes, including the filling of plastics, particles of micron size, e.g., 300 microns or less, are favoured, and particularly particles below 100 microns in size.

The coating metal is of course selected with regard to the intended use of the coated particles. For discontinuously coating reflex-reflecting beads to give enhanced reflection as hereinbefore referred to, it is for example suitable to employ silver, tin, copper, chromium, aluminium bronze or brass. Examples of catalyst metals are: silver, gold, nickel, iron, cobalt, rhodium, platinum, palladium and Roney alloys. Examples of metals for coating filler particles for plastics material for influencing the electrical or di-electric properties are: silver, copper and aluminium. When the coating is required to render inductive heating of the product possible, ferro-magnetic metals such as iron and nickel are preferred although high frequency heating is possible with other types of metal.

The following are examples of methods according to the invention:

Example 1

A mixture of 90 percent by weight of soda-lime glass beads in a size range 300 to 400 microns diameter, and 10 percent by weight of flaky aluminium powder, Type E 900 (marketed by Eckart Werke, Furth, Germany) was fed to a flame spraying gun manufactured by Metco Incorporated of Westbury, L.I., N.Y., United States of America and known as the "Metco" (Trade Mark) Thermo Spray 2P with vibratory feeder, fired with hydrogen and oxygen. The flame setting corresponded with an oxygen consumption of 0.45 $m^3$ and a hydrogen consumption of 2.1 $m^3$ per hour.

The spray was directed into a receptacle for the coated beads. These beads were found to have retained their spherical shape and each bead was found to bear hundreds of surface spots of aluminium randomly distributed over the entire surface of the bead. The aluminium forming these spots had become deposited in part by condensation of metal vapour on the glass beads and in part by smelting and solidification of aluminium in contact with the beads. The surface spots were in the size range 2-50 microns. The adherence of the metal spots to the glass was extremely good. The aluminium resisted complete removal even with a highly concentrated (6 Normal) aqueous solution of potassium hydroxide.

The spot-coated beads had good reflex-reflecting properties. The beads also had potential value as a filler for plastics material.

Example 2

Example 1 was repeated with the modification that the proportion of the aluminium powder in the starting mixture was increased to 40 percent by weight.

On examination the glass beads recovered from the coating chamber were found to have retained their spherical shape and each bead was found to be all-over coated with aluminium. The adherence of the aluminium to the glass was as good as in the case of the coated beads produced according to Example 1.

Example 3

Example 1 was repeated with the single modification that ground soda-lime glass (size 300 to 400 microns) was substituted for the spherical glass beads. It was found that the glass grains became superficially melted in the flame and became spherulised by surface tension effects. The end product was spot-coated spherical beads similar to those forming the end product of Example 1.

Example 4

Example 2 was repeated with the single modification that beads of boro-silicate glass of the following composition: $SiO_2$ 64.7%, $B_2O_3$ 14.5%, $Na_2O$ 19.9%, $CaO$ 0.14%, $Al_2O_3$ 0.7%, $Fe_2O_3$ 0.06% and traces of $MgO$ (percentages by weight) were used instead of the soda lime glass beads. The beads became all-over coated with aluminium in the same way as the beads used in Example 2 and the aluminium showed very good adherence to the boro-silicate glass.

Examples 5 to 8

Examples 1 to 4 were repeated with the modifications that in each case the substrate particles or beads were all below 100 microns in size and bronze powder (Ecka AS 011; bulk density 3.5 g/cm$^3$; grain size 25 microns) was used instead of the aluminium powder. The proportion of metal powder used in Examples 5 and 7 was slightly higher than in the corresponding Examples 1 and 3 in order to allow for the higher specific surface of the glass. The end product in each case was spherical glass beads below 100 microns in size, coated as in the corresponding earlier example but with bronze rather than with aluminium. The bronze adhered very well to the glass.

Examples 9 to 12

Examples 5 to 8 were repeated with the modification that in each case copper powder (bulk density 1.3 g/cm$^3$; grain size 30 microns) was used instead of the bronze powder. The end product in each case was spherical glass beads coated as in the corresponding earlier example but with copper rather than with bronze. The copper adhered very well to the glass.

Example 13

A mixture of 99 percent by weight of spherical beads of soda-lime glass, approximately 300 microns in size and 1 percent by weight of flaky aluminium powder as used in Example 1 was fed into a gas fired furnace tube 1 is illustrated in FIG. 1 of the accompanying diagrammatic drawings. The gas was supplied to a single burner 2 located centrally within the lower end of the tube. The flame temperature was approximately 1,200°C and the temperature of the exhaust gas at the top of the tube was approximately 400°C. The mixture of glasss beads and aluminium powder was fed as a continuous stream into the burner flame, along a chute 3, which was fed by a belt conveyor 4. The particles were carried upwardly within the furnace tube by the rising current of hot gas and the particles leaving the top of the furnace tube were caught in a surrounding receptacle 5 from which they discharged along a pipe 6. The discharged glass bends were examined and it was found that each bead bore a coating of aluminium at a multiplicity of spots distributed over the entire bead surface, the aluminium having been deposited wholly or mainly from the vapour phase.

Example 14

Example 13 was repeated with however the modifications that the proportion of aluminium powder in the starting mixture was increased to 40 percent by weight. The glass beads discharging from the receptable 5 were found to have become all-over coated with aluminium.

Examples 15 and 16

Examples 13 and 14 were repeated but with the modification that ground glass (particle size approximately 300 microns) was used instead of the shaped glass beads. In the furnace tube the glass particles became spherulised under surface tension effects and the end product in each case was spot or all-over coated beads as in the corresponding earlier example.

Examples 17 to 20

Examples 13 to 16 were repeated but with the modifications that glass beads or grains up to 100 microns in size were used instead of the larger beads or grains employed in the said earlier examples, and in Examples 17 and 19 a slightly higher proportion of aluminium powder was used than in the corresponding Examples 13 and 15 in order to allow for the higher specific surface of the glass. The end product in each case was spot or all-over metallised beads as in the corresponding earlier example, the only difference being in the size of the beads.

Example 21

A mixture of 95 percent by weight of ceramic particles in the size range 3 to 5 mm and 5 percent by weight of silver-coated copper powder (minimum silver content 10%; particle size 20-50 microns) was fed into the top of a gas fired furnace tube. The furnace was fired by a ring of gas burners directed radially inwards. The temperature gradient was from 1,200° to 400°C. During the descent of the mixture some of the metal powder became vapourised. The ceramic particles discharged from the bottom of the furnace tube were examined. the beads bore surface spots of metal at a multiplicity of places distributed over the entire surfaces of the beads. These surface spots had been formed by deposition of metal from the vapour phase and/or by melting and solidification of metal particles in contact with the ceramic particles.

Example 22

Example 21 was repeated with the modification that the proportion of silver-coated powder in the starting mixture was adjusted to 50 percent by weight. During the descent of the mixture in the furnace tube the ceramic particles became all-over coated with metal.

Example 23

Example 21 was repeated but with modifications that vitrocrystalline beads in the size range 0.8 to 2 mm were used in place of the larger porcelain beads and the beads and metal powder were used in the weight ratio of 99:1. The vitrocrystalline beads had been formed by first producing glass beads of the composition: $SiO_2$ 48%, $Al_2O_3$ 32%, $Na_2O$ 10%, CaO 2%, $TiO_2$ 8% (percentages by weight) and then subjecting the glass beads to a heat treatment as known per se to cause partial devitrification of the glass. The vitrocrystalline beads became spot-coated with metal during their descent in the furnace tube.

Example 24

Ceramic particles 0.8 to 1.0 mm in size were all-over coated with a borax-containing flux identified as Flux No. 423 Bl marketed by Oxhydrique Internationale, 31, Rue Pierre van Humbeek, Brussels 8. The flux-coated particles were subsequently mixed with bronze powder as used in Examples 5 to 8, in a proportion of 50:50 by weight. The mixture was fed into the top of a gas fired furnace tube as used in Example 21. The ceramic particles discharged at the bottom of the furnace were found to have become all-over coated with bronze which was very firmly bonded to the ceramic particles by the undercoating of flux.

Example 25

Figure 2:
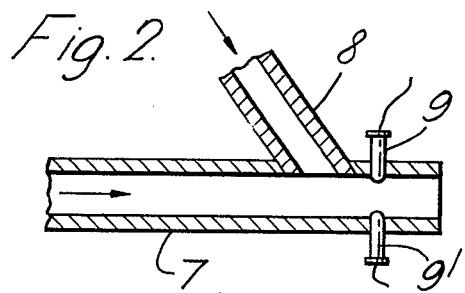

A mixture of beads of soda-lime glass, the beads being all below 50 microns in size, and copper powder (particle size up to 30 microns), the mixture comprising 90 percent by weight of the glass beads and 10 percent by weight of the copper powder, was fed to a plasma torch marketed by Arcos, of Brussels under the name "Plasmacos" Type PJ 300. The torch, which is diagrammatically illustrated in FIG. 2 of the accompanying drawings, comprises a barrel 7 through which a stream of nitrogen gas was fed, in the direction indicated by the arrow, at a flow rate of 15 litres per minute. The mixture of particles to be heated was carried into the barrel along a feed pipe 8 by an entraining stream of nitrogen with a flow rate of 5 litres per minute. The torch electrodes, 9,9' are located immediately ahead of the point at which the particle mixture enters the barrel. The electrodes are connected to a source of E.M.F. supplying a 250 amp current at 80 volts. In order to strike the arc, a stream of argon gas was fed through the barrel at a rate of 10 litres per minute and the nitrogen streams were started once a stable arc had become established. The glass beads in the mixture of particles discharging from the torch were examined and it was found that the glass beads had become spot-coated with copper, the coating spots being distributed over the entire surfaces of the beads.

Example 26

A mixture of 70 parts by weight of "Teflon" particles (particle size 50 to 100 microns) and 30 parts by weight of powdered alloy comprising 92 percent tin and 8 percent antimony (particle size 50 microns) was fed into a heated furnace tube in which the particles were carried upwardly by a rising current of hot gas. The furnace temperature gradient was adjusted to 500° to 150°C. The plastics particles discharged from the top of the furnace were found to be spot-coated with the alloy, the coating spots on each particle being distributed over the entire surface area of the particle.

Example 27

A quantity of spot-coated beads produced according to Example 1 were applied to a white matrix leaving approximately half the surface area of each bead exposed, to form a light-reflecting panel. The orientation of the beads is of no consequence because the beads function in the same way irresponsive of which part of their surface is exposed. The fact that the beads produced according to Example 1 do not have reflex-reflecting properties as good as beads reflectorised with a coating of metal over half the bead surface is due to unavoidable oxidation of the aluminium. On the other hand the spot-coated beads can be produced and set more cheaply than the hemispherically reflectorised beads.

By way of comparison, spot-coated glass beads according to the invention wherein the spots are composed of silver can have reflex-reflecting properties comparable to those of hemispherically reflectorised beads provided care is taken to avoid oxidation of the silver. Similar very good reflex-reflecting properties are possessed by spot-coated glass beads according to the invention wherein brass or copper is used as the coating material. Brass gives a yellow reflection and copper gives a reddish reflection Any reflex-reflecting spot-coated beads according to the invention can be incorporated as an ingredient in a coating composition for application to surfaces by painting, upsraying or in any other way.

Example 28

Steatite beads up to 100 microns in size were spot-coated with copper and the spot-coated beads were incorporated into a quantity of the standard polyester marketed under the Trade Mark "Leguval" by Farbenfabriken Bayer A.G. of Leverkusen, Germany in a proportion of 5 parts by weight of the beads to 2 parts by weight of the polyester. The resulting composition was capble of being heated by induction heating.

Example 29

Polymethlmethacrylate beads 2 mm in size were spotcoated with aluminium by heating a mixture comprising 90 percent by weight of the beads and 10 percent by weight of flaky aluminium powder of the type specified in Example 1 to cause some of the aluminium to become fluid and to transfer or condense onto the aluminium beads and subsequently to solidify in situ. During the heating of the mixture the plastics beads, with aluminium flakes adhering thereto, became superfically softened. The spot-coated beads had good reflex-reflecting properties. They could be applied to a matrix by spraying, or incorporated into a coating composition.

What I claim is:

1. A method of discontinuously applying a coating metal to the surfaces of substrate particles of another material with the use of a heated zone and a zone that is cooler relative to the temperature of said heated zone, comprising the steps of:
   a. forming a mixture of particles of said coating metal and said substrate particles wherein a major portion by weight of said mixture is constituted by said substrate particles,
   b. passing said mixture into a stream of hot gas to form said mixture into a loose condition in said heated zone and to effect heating of said particles of said mixture and to melt at least some of said coating metal particles so that said melted metal particles will form spots of a metal coating at a multiplicity of spaced places distributed over the entire surface of the particle,
   c. causing said spot-coated particles to pass while maintained in loose condition by said hot gas stream, from said heated zone to said cooler zone, wherein said coating spots solidify, and
   d. subsequently collecting said spot-covered substrated particles.

2. The method as claimed in claim 1, wherein said mixture contains not more than 10 percent by weight of said particles of coating metal.

3. A method according to claim 1, wherein said substrate particles are initially non-rounded particles and the said heating of the said mixture of particles causes said substrate particles to become rounded under surface tension effects.

4. A method according to claim 1, wherein said substrate particles are particles of light-transmitting material and the composition of the particles which are mixed and heated together with such substrate particles is such that the said coating formed on the individual substrate particles gives the coated particles better reflex-reflecting properties in respect of incident light rays than the uncoated particles.

* * * * *